United States Patent [19]

Longtin

[11] Patent Number: 5,601,682
[45] Date of Patent: Feb. 11, 1997

[54] METHOD OF MAKING REFLECTIVE DECALS

[75] Inventor: Andre G. Longtin, Weare, N.H.

[73] Assignee: Moore Business Forms, Inc., Grand Island, N.Y.

[21] Appl. No.: 920,656

[22] Filed: Jul. 28, 1992

[51] Int. Cl.$^6$ .......................... B32B 31/08; B32B 31/18; B32B 31/28
[52] U.S. Cl. ...................... 156/272.2; 156/192; 156/249; 156/264; 156/267; 156/268; 156/269; 156/277; 156/280; 156/324
[58] Field of Search ..................................... 156/277, 240, 156/249, 280, 231, 235, 237, 238, 239, 184, 267, 270, 278, 272.2, 275.5, 191, 192, 248, 324; 428/40

[56] References Cited

U.S. PATENT DOCUMENTS

| | | |
|---|---|---|
| 2,274,744 | 3/1942 | Ruffin . |
| 3,005,382 | 10/1961 | Weber . |
| 3,569,676 | 3/1971 | Stiles . |
| 3,936,567 | 2/1976 | Vesely . |
| 4,008,115 | 2/1977 | Fairbanks et al. ........................ 156/267 |
| 4,059,912 | 11/1977 | Noah . |
| 4,150,183 | 4/1979 | Reed . |
| 4,475,978 | 10/1984 | Bartl ..................................... 156/285 X |
| 4,977,006 | 12/1990 | Smith et al. .......................... 427/146 X |
| 4,980,108 | 12/1990 | Suzuki et al. ......................... 427/172 X |
| 4,983,436 | 1/1991 | Bailey et al. .............................. 428/40 |
| 5,021,110 | 6/1991 | Kobayashi . |
| 5,047,286 | 9/1991 | Kaburaki et al. ................. 427/407.1 X |
| 5,151,309 | 9/1992 | Dollinger ................................... 428/40 |

OTHER PUBLICATIONS

Fasson Product Data Sheet "Fasign 7500 Series", Jun. 1987.
3M Product Bulletins 316, 314, 318, and 350 for "Scotchlite", Ensure Products; 1989.

*Primary Examiner*—David A. Simmons
*Assistant Examiner*—M. Curtis Mayes
*Attorney, Agent, or Firm*—Nixon & Vanderhye P.C.

[57] ABSTRACT

A method of making reflective decals, such as for use on automobile license plates, allows one to utilize conventional reflective face stock, yet in a mechanized and efficient manner affix a decal to a carrier for mailing. A standard web of reflective face stock, adhesive, and first liner is coated with a second adhesive layer (on the first liner) and a second liner is applied. The web is printed and dried, as with UV ink and by UV drying. Sequential numbers can be applied by printing, as can an expiration year, etc. The web is then die cut to separate a matrix containing reflective stock, first adhesive, first liner, and second adhesive, from surrounding printed decals, the decals spaced from each other and connected by the second liner (e.g., 1.5 mil silicone coated polyester). The matrix material is removed from the web by winding it up into a roll, and the web is taken up, and then ultimately handled by conventional labeling equipment to affix individual decals (by the second layer of adhesive) to individual carriers. The printed web can also be acted upon to flood coat the face stock with scuff resistant UV overprint varnish, and then UV drying the varnish.

20 Claims, 2 Drawing Sheets

METHOD OF MAKING REFLECTIVE DECALS

BACKGROUND AND SUMMARY OF THE INVENTION

Reflective decals are used by most states to validate on a year-by-year basis automobile license plates, and for other purposes. Typically, a decal is made from conventionally available reflective material (such as acrylated urethane retroflective film), and the individual decals are individually glued to a decal carrier in order to be sent in the mail. This procedure is not as efficient as desired.

According to the present invention, a method of making reflective decals, particularly for automobile license plates, is provided which is highly mechanized, and results in the quick and accurate production of the decals in an effective manner, and allows them to be readily applied to individual carriers by conventional automated labeling machines (e.g. blow-on techniques).

According to one aspect of the present invention, a method of making reflective decals comprises the following steps: (a) Moving in a given direction a first web of reflective material comprising a reflective face stock layer, a first adhesive layer, and a first liner layer, the first adhesive layer sandwiched between the reflective face stock and first liner layers. The first web is typically commercially purchased reflective film, such as an acrylated urethane retroreflective film available from Fasson under the trademark "FASIGN" 7500 series, or available from 3M under the trade designation "SCOTCHLITE" Reflective Sheeting 5330. (b) Applying a second adhesive layer to the moving first web first liner layer, and applying a second liner layer to the second adhesive layer to produce a second web. (c) Moving the second web in a given direction. (d) Printing the moving second web reflective face stock to provide indicia thereon. (e) Drying the printed indicia. (f) Die cutting the printed second web to separate a matrix containing reflective stock, first adhesive, first liner, and second adhesive surrounding printed decals, the decals spaced from each other and connected by the second liner. (g) Removing the matrix material from association with the decals, and second liner to produce a third web containing the decals spaced along the second liner. And (h) applying the decals from the third web to a carrier so that the second layer of adhesive affixes the decals to the carrier.

There may also be the further steps, between steps (g) and (h) of taking up the third web and subsequently letting off the third web and applying the decals to a carrier by blow-on techniques (e.g., using a Fasson Mark VI labeler). Step (d) may be practiced by printing with UV curable ink in which case step (e) is practiced using a UV dryer, and it is also desirable, between steps (e) and (f), to coat the printed reflective face stock with overprint varnish (such as a scuff resistant UV curable overprint varnish) and then drying it (e.g., UV drying the varnish).

Step (b) is typically practiced by applying a 1.5 mil polyester liner as the second liner. Step (d) is practiced to apply indicia indicating a year to the second web, and also typically by applying consecutive numbers to the second web.

According to another aspect of the present invention, a method of making reflective decals is provided comprising the following steps: (a) Moving in a given direction a first web of reflective material comprising a reflective face stock layer, a first adhesive layer, and a first liner layer, the first adhesive layer sandwiched between the reflective face stock and first liner layers. (b) Applying a second adhesive layer to the moving first web first liner layer, and applying a second liner layer to the second adhesive layer to produce a second web. (c) Moving the second web in a given direction. (d) Printing the moving second web reflective face stock with UV ink to provide indicia thereon. (e) UV drying the printed indicia. (f) Die cutting the printed second web to separate a matrix containing reflective stock, first adhesive, first liner, and second adhesive surrounding printed decals, the decals spaced from each other and connected by the second liner. (g) Removing the matrix material from association with the decals, and second liner to produce a third web containing the decals spaced along the second liner. And (h) taking up the third web into a roll.

According to yet another aspect of the present invention, a method of making automobile license plate reflective decals is provided using a web comprising a reflective face stock, a first adhesive layer, a first liner, a second adhesive layer, and a second liner, by the following steps: (a) Printing the web reflective face stock to provide indicia thereon. (b) Drying the printed indicia. (c) Die cutting the printed web to separate a matrix containing reflective stock, first adhesive, first liner, and second adhesive surrounding printed decals, the decals spaced from each other and connected by the second liner. (d) Removing the matrix material from association with the decals, and second liner to produce a second web containing the decals spaced along the second liner. And (e) applying the decals from the second web to a carrier so that the second layer of adhesive affixes the decals to the carrier.

It is the primary object of the present invention to provide an effective automated method for making reflective decals, typically for automobile license plates. This and other objects of the invention will become clear from an inspection of the detailed description of the invention, and from the appended claims.

DETAILED DESCRIPTION OF THE DRAWINGS

Figure 1:
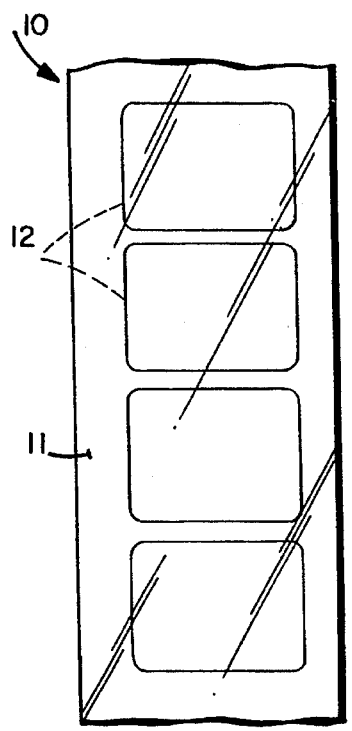
FIG. 1 is a top plan schematic view of an exemplary first web utilized in the practice of the method of the present invention.

An exemplary commercially available first web 10 utilized in the practice of the method of the present invention is shown schematically in FIG. 1. It includes a reflective face stock layer 11, from which decals will ultimately be constructed, the decals shown in phantom line at 12 in FIG. 1. The conventional reflective material web 10 illustrated in FIG. 1 may comprise an acrylated urethane retroreflective film with a permanent pressure sensitive adhesive and a liner, such as sold by Fasson under the trademark "FASIGN", 7500 series. Alternatively, it can be reflective sheeting such as sold by 3M under the trademarks "SCOTCHLITE" or "ENSURE", typically SCOTCHLITE Reflective Sheeting 5330, SCOTCHLITE Validation Sheeting 5390, SCOTCHLITE Validation Security Sheeting 5350, or ENSURE Validation Security Sheeting.

Figure 2:
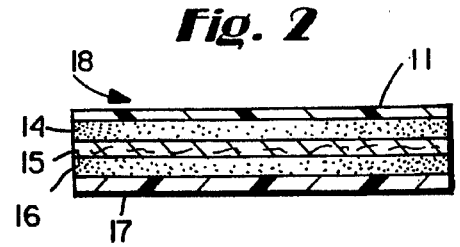
FIG. 2 is a is a longitudinal cross sectional view, with the various components shown exaggerated in size for clarity of illustration, of a second web made from the first web of FIG. 1.

According to the present invention, a conventional web 10 is made into a piggy-back construction. As illustrated in FIG. 2, the conventional purchased components comprise the reflective face stock 11, from the first permanent pressure sensitive adhesive layer 14, and first liner layer 15, such as a conventional kraft liner. In order to make a piggy-back construction, a second permanent adhesive layer 16 is added to the first liner 15, and a second liner layer 17 is placed over the second pressure sensitive adhesive layer 16. The second liner 17 may comprise a polyester liner, such as a 1.5 mil clear polyester silicone coated (both sides) liner. This produces the second web 18 of FIG. 2, the second web 18 typically made from the first web 10 by applying the second adhesive layer 16 and second liner layer 17 to the moving first web 10, using conventional techniques.

Figure 3:
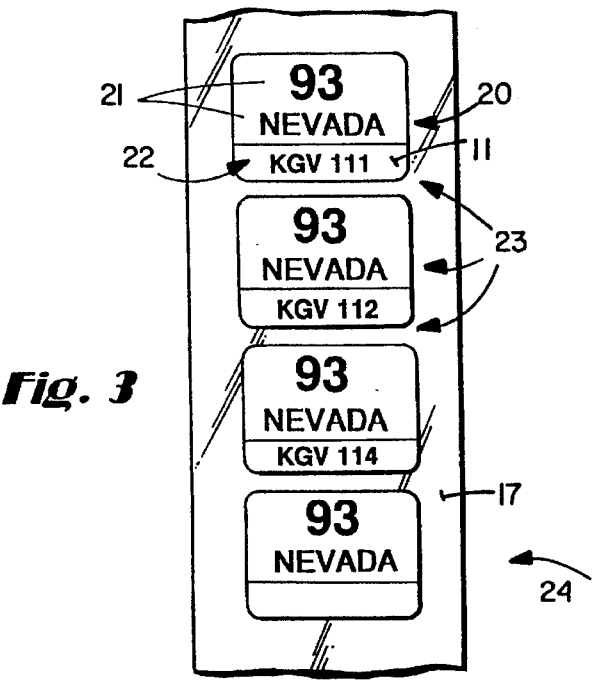
FIG. 3 is a top plan view of an exemplary third web, according to the invention, made from the second web of FIG. 2.

The second web 18 is formed into a third web having spaced decals 20, which are printed with indicia 21, and also sequentially numbered as indicated at 22 (see FIG. 3). The areas surrounding the decals 20, indicated by reference numeral 23 in FIG. 3, contained matrix material that was removed so that only the decals 20 on the second polyester liner 17 remain as the third web 24.

Figure 4:
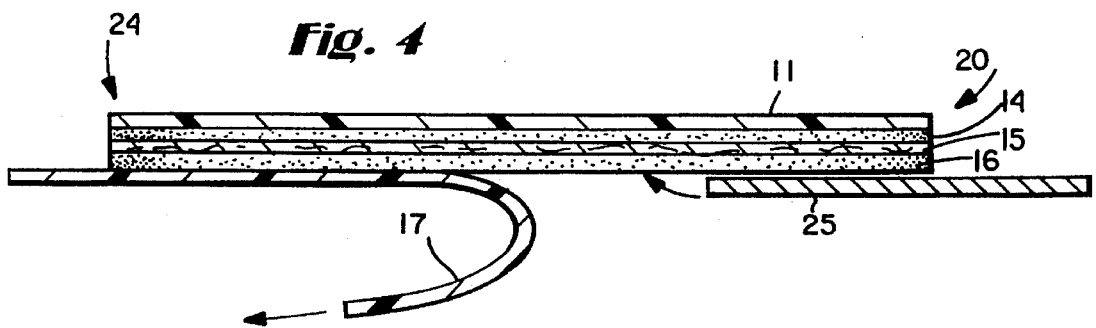
FIG. 4 is a is a longitudinal cross sectional view, with portions exaggerated in size for clarity of illustration, showing the application of a decal from the web of FIG. 3 onto a decal carrier.

As indicated in FIG. 4, the third web 24 is utilized with a conventional labeling machine, such as a Fasson Mark VI labeler, to apply the decals 20 to a decal carrier 25, the liner 17 being removed and replaced by the decal carrier 25. Individual labels 20 and individual decal carriers 25 are then mailed to automobile licensees (or for other uses of the method of the invention, other reflective decal users).

Figure 5:
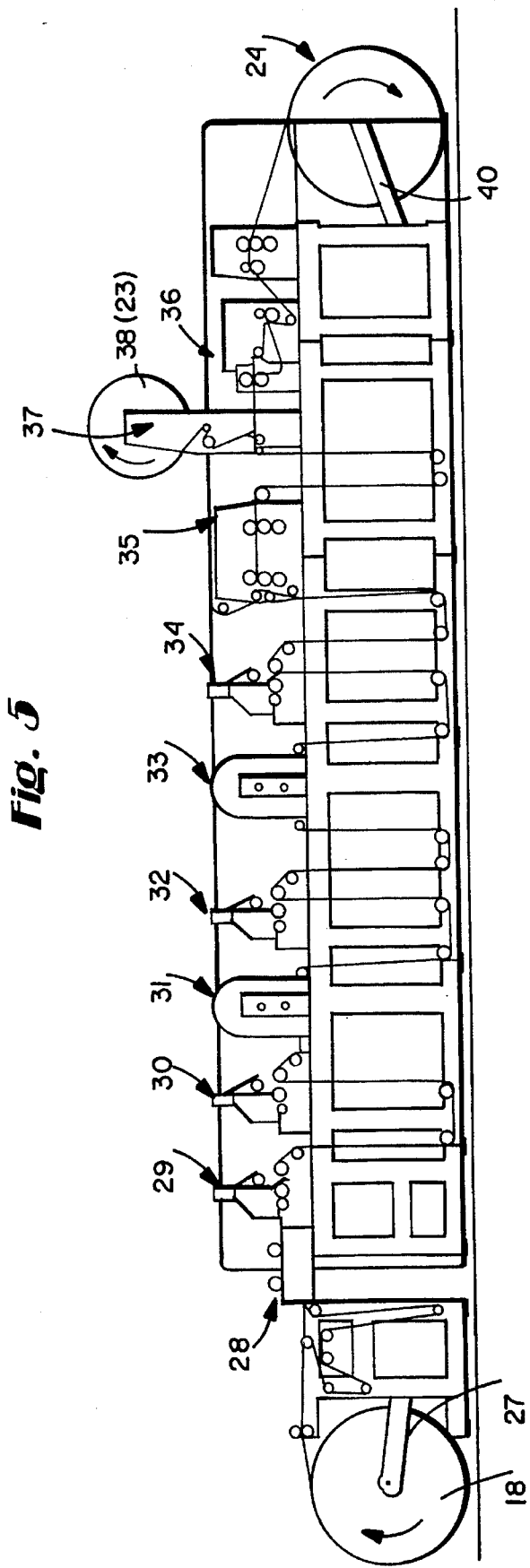
FIG. 5 is a side schematic view of exemplary apparatus practicing the method of the present invention.

FIG. 5 illustrates the equipment utilized to produce the third web 24 (FIGS. 3 and 4) from the second web 18 (FIG. 2).

The second web 18, in roll form, and mounted on roll let-off device 27, is associated with a 1600 Webtron Flexographic Press which has been modified for this purpose. The web 18 (with the reflective face stock 11 on the outside, and "up", during processing) passes through a consecutive numbering unit 28, which may apply the indicia 22 (see FIG. 3) to the web 18. It then passes to a UV curable ink print deck 29 in which UV curable ink is used to print on the reflective face stock 11. Things that can be printed—as indicated by indicia 21 in FIG. 3—includes the year ("93"), which may indicate the year of automobile license renewal, and the State ("Nevada"), or other desired indicia. The web 18 then passes on, if desired, to a second UV curable ink print deck 30, and then to a conventional UV dryer, where the printing (e.g., indicia 21) is dried.

Preferably, some sort of protective coating is provided over the reflective face stock 11 which has been printed with the indicia 21, 22. This may be accomplished at the print deck 32 where an overprint varnish is applied, e.g., by flood coating the face stock 11 with a scuff resistant UV curable overprint varnish. The varnish is then dried in the UV drier 33, and the web 18 then moves onto the optional flexo print deck 34, and then to a conventional die cutting unit 35. At the die cutting unit 35, the matrix material surrounding the decals 20—the absence of the matrix material being indicated by reference numeral 23 in FIG. 3—is cut so that it is separate from decals 20, by cutting through the web 18 down to—but not through—the second liner layer 17. At the next stage in the apparatus of FIG. 5, the matrix material is removed, e.g., by pull-roll assembly 36, and the matrix material take-up 37, which rolls the matrix material into the roll 38. The matrix material includes the face stock 11, first adhesive layer 14, kraft liner 15, and second adhesive layer 16 for all those areas of the original web 18 except for the decals 20. Since the adhesive 16 has a greater affinity for the liner 15 than the silicone coated polyester liner 17, it is removed with the rest of the matrix material from the areas 23.

After the matrix material is removed (36 through 38), the web 24 is taken up on the take-up mechanism 40. Normally, the application of the web 24 to the decal carriers 25 does not take place on the equipment of FIG. 5. Typically, this is done at a location remote from the equipment illustrated in FIG. 5, such as by utilizing a conventional Fasson Mark VI labeler. Utilizing the labeler, as schematically illustrated in FIG. 4, the bottom liner 17 is removed and discarded, exposing the second adhesive 16 on the first liner 15. The decal 20 is placed into position and affixed to the carrier 25 by the second adhesive layer 16. Once the carrier 25, with attached decal 20, is received by the ultimate user, he or she can remove the reflective stock 11 with adhesive 14 thereon from the liner 15 (and adhesive 16 and carrier 25), and apply the decal 20 to another surface, such as an automobile license plate, with the pressure sensitive adhesive 14.

It will thus be seen that according to the present invention a highly automated efficient method of making reflective decals is provided. While the invention has herein been shown and described in what is presently conceived to be the most practical and preferred embodiment, it will be apparent to those of ordinary skill in the art that many modifications may be made thereof within the scope of the invention, which scope is to be accorded the broadest interpretation of the appended claims which encompass all equivalent methods and procedures.

What is claimed is:

1. A method of making reflective decals, comprising the steps of automatically:

(a) moving in a given direction a first web of reflective material comprising a reflective face stock layer, a first adhesive layer, and a first liner layer, the first adhesive layer sandwiched between the reflective face stock layer and the first liner layer;

(b) applying a second adhesive layer to the moving first web first liner layer, and applying a second liner layer to the second adhesive layer to produce a second web;

(c) moving the second web in a given direction;

(d) printing the moving second web reflective face stock to provide indicia thereon;

(e) drying the printed indicia;

(f) die cutting the printed second web to separate a matrix containing reflective stock, first adhesive, first liner, and second adhesive, from surrounding printed decals, the decals spaced from each other and connected by the second liner;

(g) removing the matrix material from association with the decals, and second liner to produce a third web containing the decals spaced along the second liner; and (h) applying the decals from the third web to a carrier so that the second layer of adhesive affixes the decals to the carrier.

2. A method as recited in claim 1 comprising the further steps, between steps (g) and (h), of taking up the third web, and subsequently letting off the third web, and applying the decals to a carrier by blow-on techniques.

3. A method as recited in claim 2 wherein step (d) is practiced by printing with UV curable ink, and step (e) is practiced using a UV dryer.

4. A method as recited in claim 3 wherein step (d) is practiced by applying consecutive numbers to the second web.

5. A method as recited in claim 4 wherein step (g) is practiced by winding the matrix material into a roll.

6. A method as recited in claim 5 wherein step (d) is practiced to apply indicia indicating a year to the second web.

7. A method as recited in claim 6 wherein the reflective face stock is acrylated urethane retroeflective film and the first adhesive is pressure sensitive permanent adhesive.

8. A method as recited in claim 1 wherein step (d) is practiced by printing with UV curable ink, and step (e) is practiced using a UV dryer.

9. A method as recited in claim 8 comprising the further steps, between steps (e) and (f), of flood coating the face stock with a scuff resistant UV varnish, and UV curable drying the varnish.

10. A method as recited in claim 1 wherein step (d) is practiced by applying consecutive numbers to the second web.

11. A method as recited in claim 1 wherein step (g) is practiced by winding the matrix material into a roll.

12. A method as recited in claim 1 wherein step (d) is practiced to apply indicia indicating a year to the second web.

13. A method as recited in claim 1 wherein the reflective face stock is acrylated urethane retroeflective film and the first adhesive is pressure sensitive permanent adhesive.

14. A method as recited in claim 1 wherein step (b) is practiced to apply a silicone coated polyester liner as the second liner.

15. A method as recited in claim 1 wherein step (b) is practiced to apply a 1.5 mil silicone coated polyester liner as the second liner.

16. A method as recited in claim 1 comprising the further steps, between steps (e) and (f), of coating the printed reflective face stock with overprint varnish, and drying the varnish.

17. A method as recited in claim 1 comprising the further steps, between steps (b) and (c), of coating the printed reflective face stock with overprint varnish, and drying the varnish.

18. A method of making reflective decals, comprising the steps of automatically:

(a) moving in a given direction a first web of reflective material comprising a reflective face stock layer, a first adhesive layer, and a first liner layer, the first adhesive layer sandwiched between the reflective face stock layer and the first liner layer;

(b) applying a second adhesive layer to the moving first web first liner layer, and applying a second liner layer to the second adhesive layer to produce a second web;

(c) moving the second web in a given direction;

(d) printing the moving second web reflective face stock with UV curable ink to provide indicia thereon;

(e) UV drying the printed indicia;

(f) die cutting the printed second web to separate a matrix containing reflective stock, first adhesive, first liner, and second adhesive, from surrounding printed decals, the decals spaced from each other and connected by the second liner;

(g) removing the matrix material from association with the decals, and second liner to produce a third web containing the decals spaced along the second liner; and (h) taking up the third web into a roll.

19. A method as recited in claim 18 comprising the further steps, between steps (e) and (f), of flood coating the face stock with a scuff resistant UV varnish, and UV curable drying the varnish.

20. A method of making automobile license plate reflective decals using a web comprising a reflective face stock layer, a first adhesive layer, a first liner layer, the first adhesive layer sandwiched between the reflective face stock layer and the first liner layer, a second adhesive layer, and a second liner layer, the second adhesive layer sandwiched between the first liner layer and the second liner layer, comprising the steps of automatically:

(a) printing the web reflective face stock to provide indicia thereon;

(b) drying the printed indicia;

(c) die cutting the printed web to separate a matrix containing reflective stock, first adhesive, first liner, and second adhesive, from surrounding printed decals, the decals spaced from each other and connected by the second liner;

(d) removing the matrix material from association with the decals, and second liner to produce a second web containing the decals spaced along the second liner; and (e) applying the decals from the second web to a carrier so that the second layer of adhesive affixes the decals to the carrier.

* * * * *